Patented Sept. 21, 1937

2,093,460

UNITED STATES PATENT OFFICE 2,093,460

MAKING MANGANESE PHOSPHATE FERTILIZER

Walter H. MacIntire, Knoxville, Tenn., assignor to Tennessee Valley Authority, Wilson Dam, Ala., a corporation of United States No Drawing. Application June 22, 1935, Serial No. 28,024

4 Claims. (Cl. 71—2)

(Granted under the act of March 3, 1883, as amended April 30, 1928; 370 O. G. 757)

This application is made under the act of April 30, 1928, and the invention herein described, if patented, may be manufactured and used by or for the Government for governmental purposes without the payment to me of any royalty thereon.

This invention relates to the production of superphosphates containing manganese in a form available as plant food.

One of the objects of this invention is to produce simultaneously a mixture of calcium phosphate and manganese phosphate. Another object of this invention is to produce a fertilizer which contains a manganese salt and which has more than one essential element of plant food. Still another object of this invention is to produce a fertilizer salt mixture containing manganese as an essential element of plant food and uncombined with other elements, such as chlorine or sulfur, which may be undesirable for the fertilization of certain crops, especially tobacco. Other objects of this invention include the production of a fertilizer salt mixture, containing more than one element of plant food, directly from mineral resources.

Concentrated superphosphates, usually called triple superphosphates, have been made from dolomite, limestone and phosphate rock, by reaction of these materials with phosphoric acid by a great variety of processes. Soils requiring a manganese supplement to one or more of the more commonly considered essential elements of plant food have had this supplement supplied, in most instances, by the addition of the required quantity of the manganese sulfate, which is not advantageous for application in connection with certain types of crops.

In my co-pending application, App. Ser. No. 28,025, filed June 22, 1935, Making manganese phosphate, I have described and claimed the process of making a soluble manganese salt which may be used in place of the manganese sulfate without the undesirable effects produced by the latter.

I have found an improvement in the production of triple superphosphates, for use on those soils that require manganese as an essential fertilizer element, by treating a mixture of a fine calcium mineral, such as dolomite, limestone, or phosphate rock, and rhodochrosite with concentrated phosphoric acid under certain definite conditions.

One example is given to show the operation of my invention. A uniform mixture of 203 parts by weight of brown Tennessee phosphate rock, containing 76.2% $Ca_3(PO_4)_2$ equivalent and 37.8 parts by weight of rhodochrosite of less than 300 mesh, containing 84.3 $MnCO_3$, 8.9% $MgCO_3$, 3.57% $CaCO_3$, 2.06% $Fe_2O_3$ and $Al_2O_3$ and 0.65% $SiO_2$, is intimately mixed with 324.3 parts by weight of phosphoric acid containing 75% $H_3PO_4$. The granular mixture resulting is cured for three weeks and a product of 534 parts by weight of a manganese containing triple superphosphate is obtained. This triple superphosphate has 3.2% water soluble manganese, calculated as $Mn_3O_4$.

It is evident that there are numerous factors which will influence conditions for the most satisfactory operation of my process, the actual limits of which cannot be established except by detailed study of each set of raw materials and finished products involved. Any calcium compound, reactive with phosphoric acid to produce monocalcium phosphate, such as dolomite, limestone or phosphate rock, may be used, although it is ordinarily preferred, from economic considerations, to use phosphate rock. Under certain circumstances the calcium compound suitable for this purpose may not be a mineral but a very inexpensive by-product from some other manufacturing operation. In other words, the calcium compound reactive with phosphoric acid to produce mono-calcium phosphate may be a crude material, such as a mineral, or other material of high or intermediate state of purity. The calcium mineral must be finely crushed but the size will depend somewhat upon the nature of each individual mineral and the properties of the individual deposit. Phosphate rock, for instance, may be 50 to 100 mesh, while dolomite may be from 100 to 200 mesh. The natural manganese carbonate, rhodochrosite, must be finely pulverized and should have a fineness of at least 300 mesh. The ratio of the calcium compound to the manganese compound used may vary within wide limits, such as a ratio of 8:1, where a moderate application of soluble manganese is desired without further blending of the product before use. This ratio may be 1:1 where the soil requires a product which will supply a material manganese supplement or where the product containing a larger proportion of soluble manganese is desired for admixture with other proper materials to form a material for application. The amount of phosphoric acid required is substantially the theoretical amount required to react with the bases present in the calcium compound and the manganese compound to convert them into monophosphates. The water required for the hydration of the phosphates formed, in addition to that produced in the reaction, is supplied by the water contained in the concentrated phosphoric acid. However, a slightly less concentrated acid may be used to supply the water unavoidably lost by evaporation during curing. The concentrated phosphoric acid, which has so far been found preferable, contains 75 to 90% $H_3PO_4$. It is necessary only to mix the fine calcium compound and the fine rhodochrosite with the concentrated phosphoric acid in a suitable mixer for a short period of time until a granular material is produced. This granular material may be cured at atmospheric temperature until the manganese contained in the mixture is substantially in the form of mono-manganese phosphate or the granular material may be heated to a superatmospheric temperature of say 50 to 100° C. in order to reduce the time for curing. The product may be crushed and screened to proper size for fertilizer use, either for direct application or for application on a mixture with other and proper fertilizer materials.

It will be seen, therefore, that this invention actually may be carried out by the modification of certain details without departing from its spirit or scope.

I claim:

1. Process of making phosphate fertilizer from phosphate rock, rhodochrosite and phosphoric acid containing manganese as an essential element, which comprises mixing the fine phosphate rock and the fine rhodochrosite, of 300 mesh; contacting the mixture intimately with the concentrated phosphoric acid, containing 75 to 90% $H_3PO_4$; and curing the resulting mixture at atmospheric temperature until the product contains the manganese substantially in the form of mono-manganese phosphate, $MnH_4(PO_4)_2.2H_2O$.

2. Process of making phosphate fertilizer from phosphate rock, rhodochrosite and phosphoric acid containing manganese as an essential element, which comprises mixing the fine phosphate rock and the fine rhodochrosite, of 300 mesh; contacting the mixture intimately with the concentrated phosphoric acid, containing 75 to 90% $H_3PO_4$; and curing the mixture at a superatmospheric temperature not to exceed 100° C., until the product contains the manganese substantially in the form of mono-manganese phosphate.

3. Process of making phosphate fertilizer from rhodochrosite, phosphoric acid and a calcium mineral, reactive with phosphoric acid to produce mono-calcium phosphate, which comprises mixing the fine mineral and the fine rhodochrosite of 300 mesh; contacting the mixture intimately with the concentrated phosphoric acid; and curing the resulting mixture until the product contains the manganese substantially in the form of mono-manganese phosphate.

4. Process of making phosphate fertilizer from rhodochrosite, phosphoric acid and a calcium compound, reactive with phosphoric acid to produce mono-calcium phosphate, which comprises mixing the fine compound and the fine rhodochrosite of 300 mesh; contacting the mixture intimately with the concentrated phosphoric acid; and curing the resulting mixture until the product contains the manganese substantially in the form of mono-manganese phosphate.

WALTER H. MacINTIRE.